United States Patent
Lee et al.

(10) Patent No.: US 8,371,648 B2
(45) Date of Patent: Feb. 12, 2013

(54) ACTIVE HEADREST APPARATUS FOR VEHICLE SEAT

(75) Inventors: Jong-Yoon Lee, Seoul (KR); Sang-Nam Park, Chungcheongnam-do (KR); In-Ho Lee, Gyeonggi-do (KR); Jin-Young Nam, Gyeonggi-do (KR); Do-Hyung Kim, Seoul (KR)

(73) Assignee: Dymos Incorporated (KR)

(*) Notice: Subject to any disclaimer, the term of this patent is extended or adjusted under 35 U.S.C. 154(b) by 378 days.

(21) Appl. No.: 12/793,259

(22) Filed: Jun. 3, 2010

(65) Prior Publication Data

US 2010/0308629 A1   Dec. 9, 2010

(30) Foreign Application Priority Data

Jun. 9, 2009 (KR) .................. 10-2009-0050770

(51) Int. Cl.
*B60R 21/00* (2006.01)
*B60N 2/42* (2006.01)

(52) U.S. Cl. ............ 297/216.12; 297/216.13; 297/216.1

(58) Field of Classification Search .......... 297/216.12, 297/216.13, 216.14
See application file for complete search history.

(56) References Cited

U.S. PATENT DOCUMENTS

| | | | |
|---|---|---|---|
| 7,097,242 B2* | 8/2006 | Farquhar et al. | 297/216.12 |
| 7,404,606 B2* | 7/2008 | Kim | 297/408 |
| 2003/0057758 A1* | 3/2003 | Baumann et al. | 297/391 |
| 2006/0267384 A1* | 11/2006 | Fischer et al. | 297/216.12 |
| 2008/0197681 A1* | 8/2008 | Jayasuriya et al. | 297/216.12 |
| 2009/0167066 A1* | 7/2009 | Mori et al. | 297/216.12 |

* cited by examiner

*Primary Examiner* — Sarah B McPartlin
(74) *Attorney, Agent, or Firm* — Hoffman & Baron, LLP

(57) ABSTRACT

An active headrest apparatus for a vehicle seat. A contact area in which the upper body of a person who is seated in a car in the event of a rear-end collision of the car is moved backward due to an inertial force and contacts a back plate can be increased, and a distance at which a headrest is moved and rises can be increased so that the function of an active headrest can be more faithfully performed and neck injury of the person who is seated in the car can be prevented to the maximum.

12 Claims, 8 Drawing Sheets

ACTIVE HEADREST APPARATUS FOR VEHICLE SEAT

CROSS-REFERENCE TO RELATED PATENT APPLICATION

This application claims the benefit of Korean Patent Application No. 10-2009-0050770 filed on Jun. 9, 2009, in the Korean Intellectual Property Office, the disclosure of which is incorporated herein in its entirety by reference.

BACKGROUND OF THE INVENTION

1. Field of the Invention

The present invention relates to an active headrest apparatus for a vehicle seat having an improved structure in which neck injury of a person who is seated in a car can be prevented to the maximum in the event of a rear-end collision of the car.

2. Description of the Related Art

Generally, seats for vehicles should be comfortable when a person is seated in a car and should protect the person who is seated in the car when the person has an emergency, such as a rear-end collision of the car.

Seat for vehicles include a seat cushion that supports the lower body of the person who is seated in the car, a seat back that supports the upper body of the person who is seated in the car, and a headrest that is combined to a top end of the seat back so that the height of the headrest can be adjusted in a vertical direction, and that supports head and neck of the person who is seated in the car.

In the event of a rear-end collision of the car that stops, neck injury of the person who is seated in the car occurs frequently. This case is called whiplash injury.

It is known that such whiplash injury, i.e., neck injury is caused by a difference in relative speed between the upper body and the head of the person who is seated in the car. Thus, while the upper body of the person who is seated in the car is moved forward due to shock of the seat back during the rear-end collision, the head of the person is kept in its original position, and a shearing force exerts on the neck of the person. The shearing force causes severe shock to the joint and muscle of the neck and injury of the joint of the neck.

To prevent the problems, an active headrest that allows a headrest to be moved to be adjacent to the head of the person during the rear-end collision has been developed, and there is a trend for reducing neck injury of the person who is seated in the car by using the active headrest.

The active headrest is generally configured to allow a driving unit included in the seat back to operate by a pressure applied by the upper body of the person who is seated in the car. While the active headrest is maintained to be inclined about 5° with respect to a seat back frame in a direction to the person who is seated in the car, the active headrest is moved toward the head of the person who is seated in the car and supports an occipital area of the person who is seated in the car.

FIG. 1 illustrates a conventional active headrest apparatus. Referring to FIG. 1, right and left ends of a back plate 1 to which a pressure is applied by the upper body of a person who is seated in a car, are combined to both end portions of a lower armature 2 as one body. An armature bracket 3 is securely combined to both end portions of the lower armature 2. Frame brackets 5 are securely combined to both side frames 4a that constitute a seat back frame 4, respectively. Link brackets 6 are rotatably combined to the armature bracket 3 and the frame bracket 5 via a hinge pin 7 and a pivot pin 8, respectively. The side frames 4a and the link brackets 6 are connected to each other via a spring member 9, and a pair of upper armatures 10 that are combined to the lower armature 2 as one body perforate a guide hole 4c formed in an upper frame 4b that connects the side frames 4a.

Thus, when the upper body of the person who is seated in the car pressurizes the back plate 1 backward due to an inertial force generated during a rear-end collision, the link bracket 6 is rotated around the pivot pin 8. As such, the back plate 1 is moved backward along a rotational radius of the link bracket 6 and rises, and simultaneously, the upper armature 10 perforates the guide hole 4c and protrudes upward.

Then, a headrest stay 11 inserted in the upper armature 10 and fixed thereto is moved and rises, and a headrest 12 combined to the headrest stay 11 is moved and rises forward in a direction to the head of the person who is seated in the car and supports an occipital area of the person who is seated in the car, thereby performing a function of an active headrest.

However, in the conventional active headrest apparatus illustrated in FIG. 1 described above, the frame bracket 5 combined to the side frames 4a protrudes toward an inside of the seat back frame 4. Thus, when the upper body of the person who is seated in the car is moved backward due to the inertial force in the event of the rear-end collision, the seat back frame 4 interferes with the frame bracket 5.

Thus, a contact area in which the upper body of the person who is seated in the car contacts the back plate 1 is decreased. When the contact area is decreased, a pressure applied to the back plate 1 is reduced. When the pressure is reduced, a distance at which the back plate 1 is moved backward is decreased, and when the distance at which the back plate 1 is moved backward is decreased, a degree at which the upper armature 10 perforates the guide hole 4c and protrudes upward is reduced. This causes a reduction in a distance at which the headrest 12 is moved forward and rises in a direction to the head of the person who is seated in the car, so that the headrest 12 cannot faithfully perform the function of the active headrest.

FIG. 2 illustrates another conventional active headrest apparatus. Referring to FIG. 2, the active headrest apparatus includes a guide member 13 including guide grooves 13a respectively combined to insides of the side frames 4a, a back plate 1 in which guide pins 14 that are inserted in the guide grooves 13a and move along the guide grooves 13a are combined to right and left end portions of the back plate 1, respectively, and a spring member 9 that connects the side frames 4a and the back plate 1 to each other.

However, even in the conventional active headrest apparatus illustrated in FIG. 2, since the guide member 13 protrudes toward an inside of the seat back frame 4a, the same problem as the conventional active headrest apparatus illustrated in FIG. 1 occurs.

If the guide member 13 is removed and the guide grooves 13a are formed directly in the side frames 4a, the conventional problems described above may be overcome. However, in that case, the strength of the side frames 4a is greatly reduced, and due to the side frames 4a with the reduced strength, the overall strength of the seat back frame 4 is decreased, so that there is a possibility that another problem that the seat back frame 4 is easily destroyed due to shock caused by the rear-end collision and the safety of the person who is seated in the car is threatened, may occur. Thus, it is not desirable to directly form the guide grooves 13a in the side frames 4a.

SUMMARY OF THE INVENTION

The present invention provides an active headrest apparatus for a vehicle seat having an improved structure in which a contact area in which the upper body of a person who is seated in a car in the event of a rear-end collision of the car is moved backward due to an inertial force and contacts a back plate is increased so that the function of an active headrest can be more stably and faithfully performed.

The present invention also provides an active headrest apparatus for a vehicle seat having a function of a stopper in which a headrest that is moved and rises in a direction to the head of a person who is seated in a car in the event of a rear-end collision of the car can be constantly maintained in its original state so that neck injury of a person who is seated in a car can be more effectively prevented to the maximum.

According to an aspect of the present invention, there is provided an active headrest apparatus for a vehicle seat, including: a back plate connected to a lower armature and including slot holes formed in right and left ends of the back plate disposed in a direction to both side frames; combination pins perforating the slot holes and combined to the side frames so that the combination pins are movable along the slot holes; a back plate spring having one end combined to the side frames and the other end combined to the back plate and providing an elastic restoring force to the back plate; and an upper armature combined to the lower armature and having an upper end which perforates an upper frame.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining exemplary embodiments of the invention with reference to the attached drawings.

Figure 3:
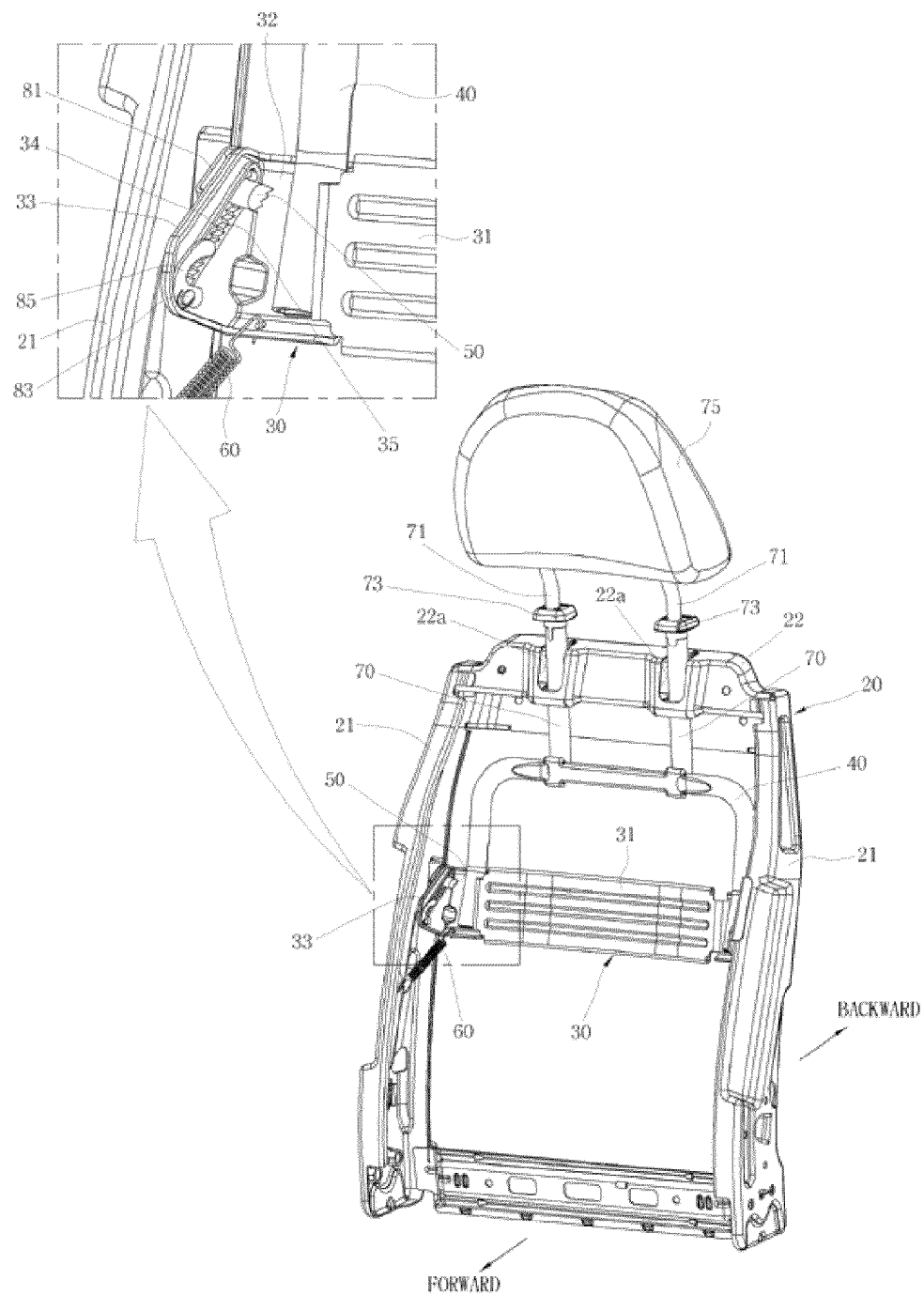
FIG. 3 illustrates an active headrest apparatus according to an embodiment of the present invention.
Figure 4:
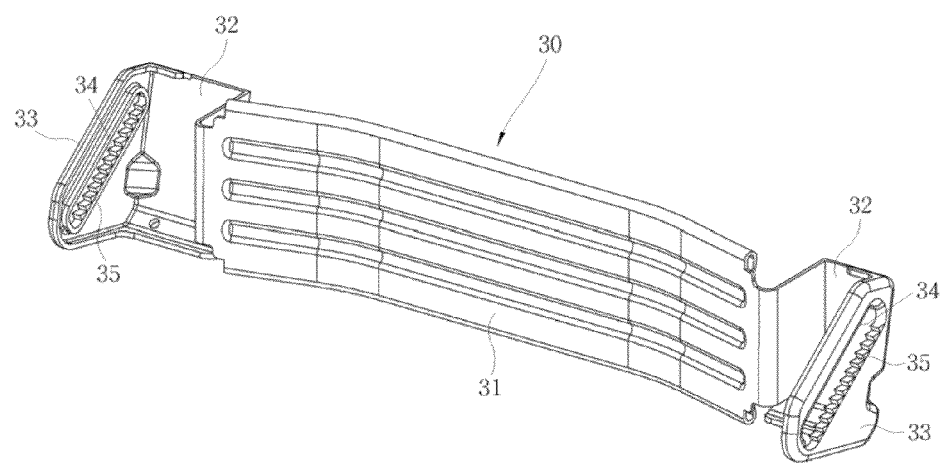
FIG. 4 is a perspective view of a back plate of the active headrest apparatus illustrated in FIG. 3.
Figure 5:
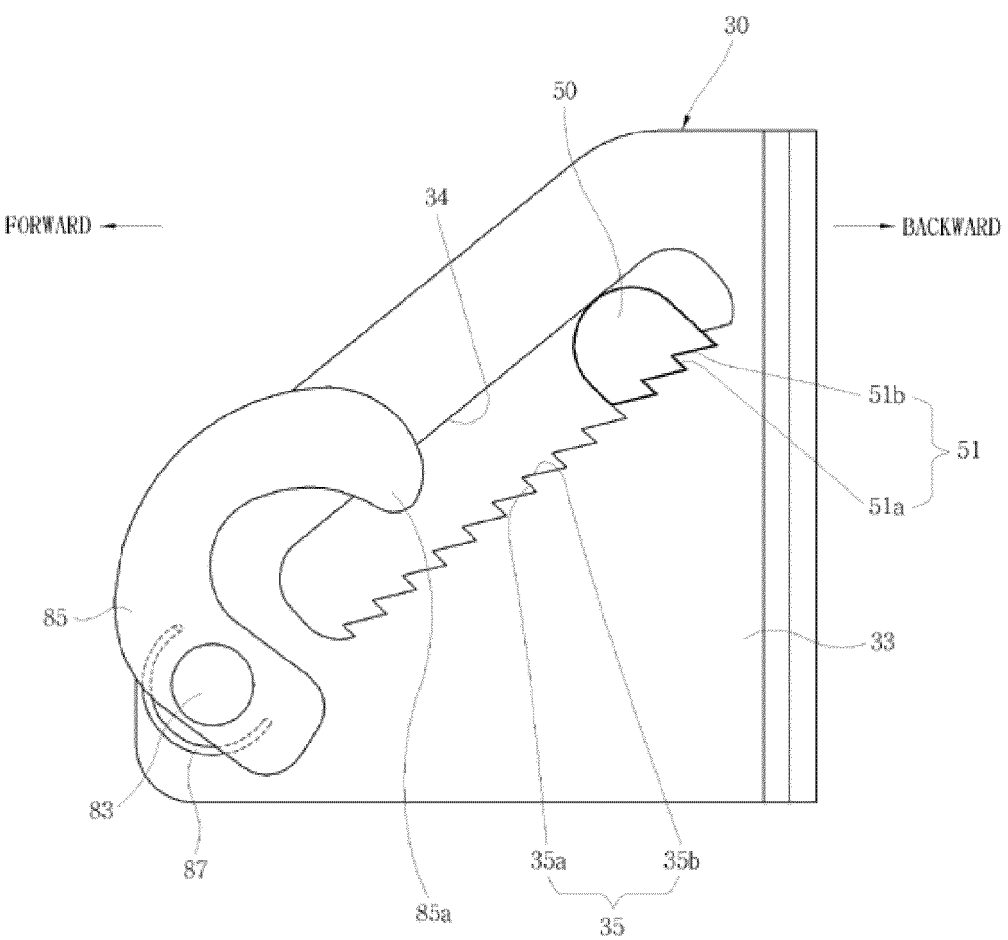
FIG. 5 illustrates a state before the active headrest apparatus of FIG. 3 operates.
Figure 6:
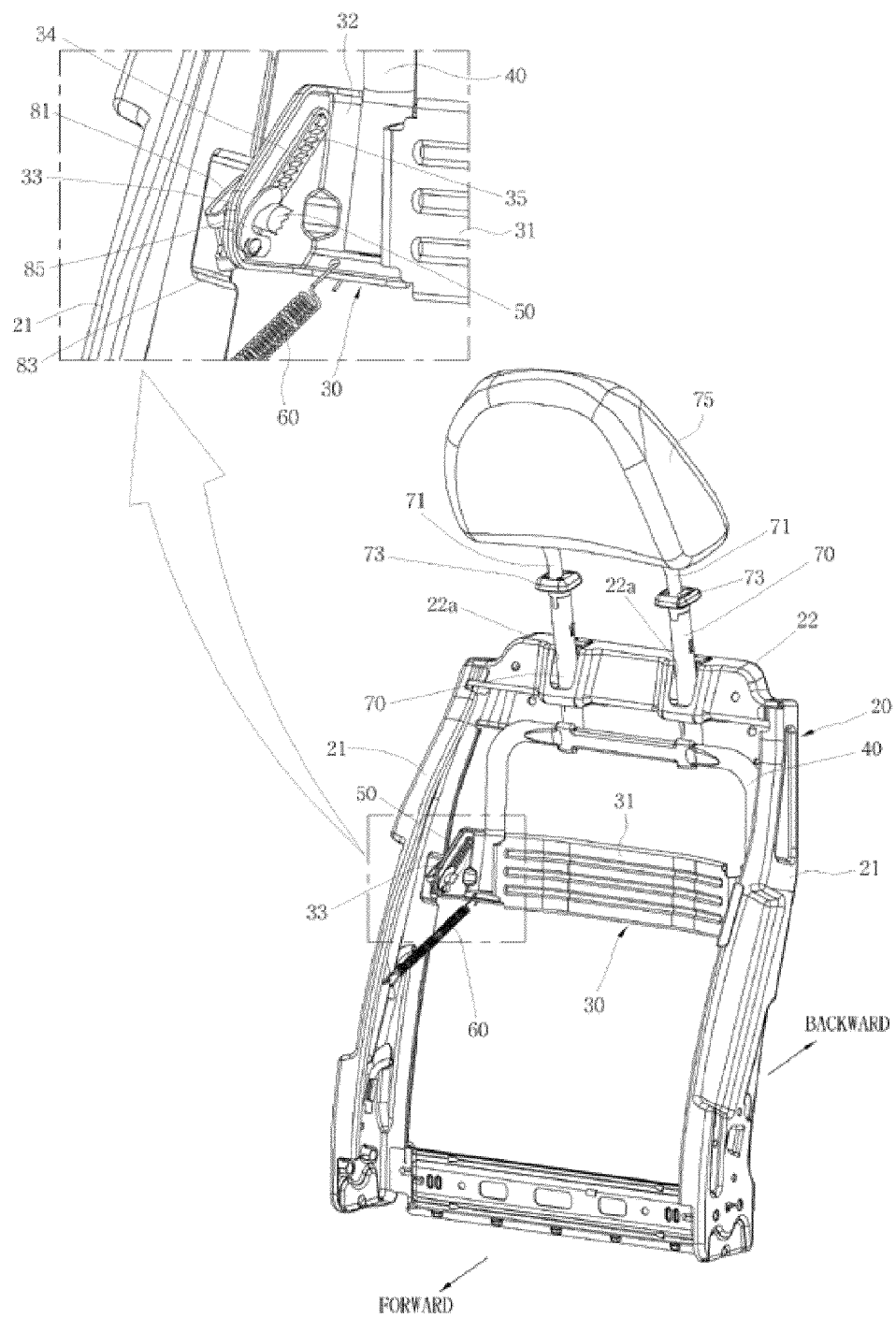
FIGS. 6 and 7 illustrate a state after the active headrest apparatus of FIG. 3 operates.
Figure 7:
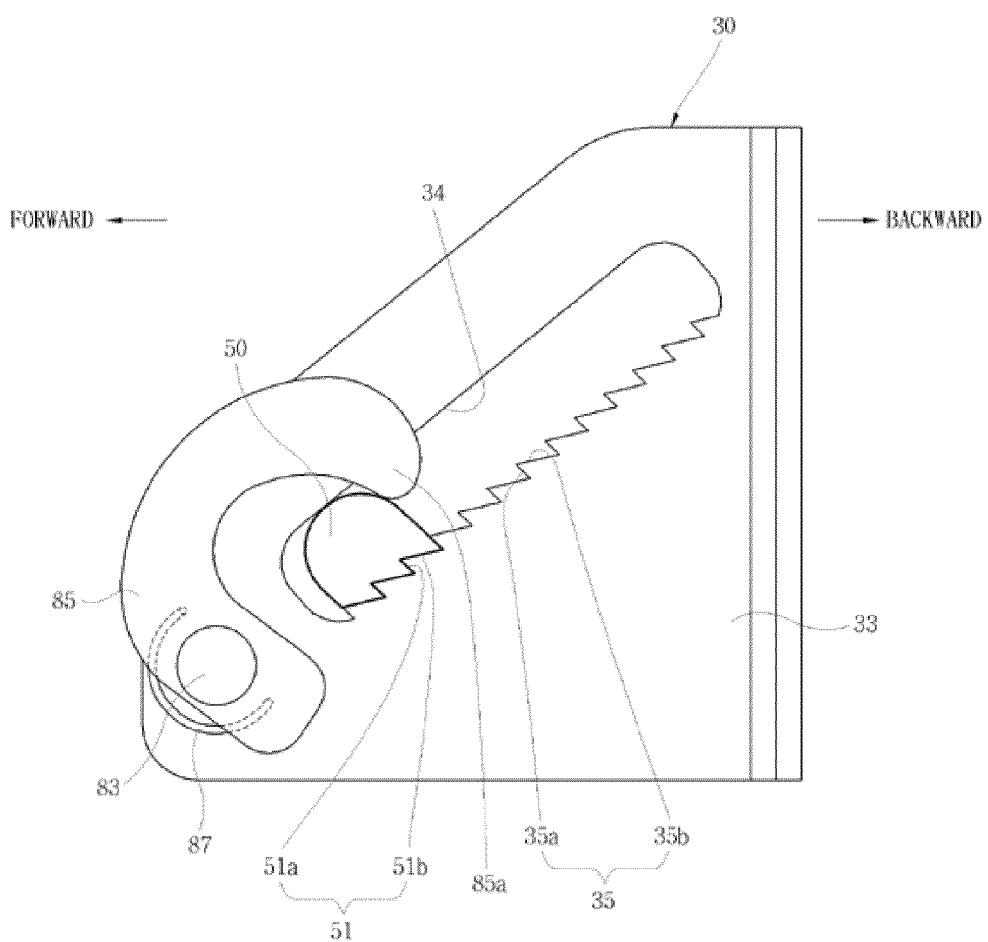

FIG. 3 illustrates an active headrest apparatus according to an embodiment of the present invention, and FIG. 4 is a perspective view of a back plate of the active headrest apparatus illustrated in FIG. 3, and FIG. 5 illustrates a state before the active headrest apparatus of FIG. 3 operates, and FIGS. 6 and 7 illustrate a state after the active headrest apparatus of FIG. 3 operates.

A vehicle seat includes a seat cushion that supports the lower body of a person who is seated in a car, a seat back that supports the upper body of the person who is seated in the car, and a headrest that is combined to a top end of the seat back so that the height of the headrest can be adjusted in a vertical direction, and that supports head and neck of the person who is seated in the car.

The framework of the seat cushion is completed by a seat cushion frame, and the framework of the seat hack is completed by a seat hack frame 20 illustrated in FIG. 3.

The seat back frame 20 includes both side frames 21 disposed parallel to each other in right and left directions of a car body, and an upper frame 22 that connects top ends of the side frames 21 to each other. A pair of guide holes 22a are formed in the upper frame 22 in a vertical direction.

The active headrest apparatus according to the present invention basically includes a back plate 30, a lower armature 40, combination pins 50, a back plate spring 60, and an upper armature 70, as illustrated in FIGS. 3 through 7.

When a rear-end collision accident happens, the upper body of the person who is seated in the car is moved in a backward direction of the car due to an inertial force. In this case, the back plate 30 is pressurized by the upper body of the person who is seated in the car.

Both ends of the lower armature 40 are connected to the back plate 30. Also, the back plate 30 is connected to the side frames 21, respectively, while right and left ends of the back plate 30 are adjacent to the side frames 21. To this end, slot holes 34 are formed in right and left ends of the back plate 30, respectively.

The back plate 30 will be described in more detail. In other words, the back plate 30 includes a pressurizing portion 31 that is an intermediate portion to which a pressure is applied while the pressurizing portion 31 contacts the upper body of the person who is seated in the car in the event of a rear-end collision, an armature combination portion 32 that extends from the pressurizing portion 31 to both sides of the pressurizing portion 31 and is combined to the lower armature 40, and right and left both-end side portions 33 that extends from the armature combination portion 32 and is bent in such a way that the side portions 33 can be maintained adjacent to and parallel to the side frames 21 and the slot holes 34 are formed in the side portions 33, respectively.

The combination pins 50 are used to connect right and left both ends of the back plate 30 to the side frames 21. The combination pins 50 perforate the slot holes 34 formed in the side portions 33 of the back plate 30 and then are combined to the side frames 21.

The combination pins 50 are movable along the slot holes 34 so that, when the back plate 30 is moved forward and backward, the combination pins 50 are disposed in an opposite end portion to one end portion of the slot holes 34.

The back plate spring 60 is a tensile spring. One end of the back plate spring 60 is combined to the side frames 21, and the other end thereof is combined to the back plate 30.

The back plate spring 60 extends when the back plate 30 is moved backward and allows the back plate 30 that have been moved backward to be restored forward due to an elastic force.

Two upper armatures 70 are provided. A bottom end of one of the upper armatures 70 is connected to the lower armature 40, and a top end thereof perforates the guide holes 22a formed in the upper frame 22.

Bottom ends of headrest stays 71 are inserted in the upper armatures 70, respectively, in such way that the headrest stays 71 are securely installed via locking portions 73 and a headrest 75 is combined to top ends of the headrest stays 71 as one body.

The slot holes 34 that are respectively formed in the side portions 33 of the back plate 30 and perforated by the combination pins 50 have a backward end that is higher than its forward end. Thus, the slot holes 34 have an inclination angle that is gradually increased from the forward end to the backward end.

Although the inclination angle of the slot holes 34 is usually approximate to 45°, it may be changed at various angles according to the type of a seat. Thus, the slot holes 34 are not limited to a predetermined inclination angle.

In an embodiment of the present invention, an elastic clip member 81 is disposed between the side frames 21 and the side portions 33 of the back plate 30 and is perforated by the combination pins 50.

The elastic clip member 81 is formed of flexible plastics and thus, elastically supports the side portions 33 of the back plate 30 with respect to the side frames 21.

Also, the elastic clip member 81 absorbs an assembly tolerance of the side frames 21, the back plate 30, and the combination pins 50 and prevents the back plate 30 from being excessively inclined in a right or left direction, thereby preventing the back plate 30 from not smoothly operating in forward and backward directions.

Thus, when the upper body of the person who is seated in the car pressurizes the back plate 30 due to an inertia force generated during the rear-end collision, the back plate 30 is moved backward by the slot holes 34 and the combination pins 50 and rises.

The combination pins 50 before the upper body of the person who is seated in the car pressurizes the back plate 30, are disposed in rear end portions (right end portions) of the slot holes 34, as illustrated in FIG. 3. However, when the upper body of the person who is seated in the car pressurizes the back plate 30 and the back plate 30 is moved backward, the combination pins 50 are disposed in front end portions (left end portions) of the slot holes 34, as illustrated in FIG. 6.

When the back plate 30 is moved backward and rises due to the pressure by the person who is seated in the car, the upper armatures 70 perforate the guide holes 22*a* and protrude upward, as illustrated in FIG. 6. Simultaneously, the headrest 75 installed by combining the upper armatures 70 and the headrest stays 71 to one another is maintained to be inclined at about 5° in a direction to the person who is seated in the car, rises in a direction to the head of the person who is seated in the car, as illustrated in FIG. 6 and supports an occipital area of the person who is seated in the car, thereby faithfully performing the function of the active headrest.

When the occipital area of the person who is seated in the car contacts the headrest 75 that has risen, the headrest 75 is instantaneously strongly loaded. The headrest 75 that has risen is subject to be fallen again due to the load.

When the headrest 75 is moved downward and is restored to an initial position illustrated in FIG. 3, the headrest 75 cannot support the occipital area of the person who is seated in the car. Thus, the head of the person who is seated in the car is leaned back, and the person who is seated in the car has a serious injury to his/her neck.

To prevent the problem, the active headrest apparatus according to the current embodiment of the present invention further includes a safety device that prevents the headrest 75 from being moved downward when the occipital area of the person who is seated in the car contacts the headrest 75 that has risen.

In other words, according to the present invention, stopper protrusions 35 in which perpendicular sides 35*a* and inclined sides 35*b* are continuously connected to one another, are formed in bottom surfaces of the slot holes 34, and pin protrusions 51 in which perpendicular sides 51*a* and inclined sides 51*b* are continuously connected to one another, are formed in the combination pins 50 so that the pin protrusions 51 can be engaged with the stopper protrusions 35.

Thus, the combination pins 50 before the upper body of the person who is seated in the car pressurizes the back plate 30 are disposed in rear end portions (right end portions) of the slot holes 34, as illustrated in FIG. 5. When the upper body of the person who is seated in the car pressurizes the back plate 30, as the inclined sides 35*b* of the stopper protrusions 35 smoothly cross the inclined sides 51*b* of the pin protrusions 51, the back plate 30 starts being moved backward, and after the backward movement of the back plate 30 is completed, the combination pins 50 are disposed in front end portions (left end portions) of the slot holes 34, as illustrated in FIG. 7.

When the combination pins 50 are disposed in front end portions (left end portions) of the slot holes 34, as illustrated in FIG. 7, the headrest 75 rises in a direction to the head of the person who is seated in the car, as illustrated in FIG. 6, and supports the occipital area of the person who is seated in the car.

In this state, when the occipital area of the person who is seated in the car contacts the headrest 75 that has risen, the headrest 75 is instantaneously strongly loaded and is subject to be fallen again due to the load.

However, since the perpendicular sides 35*a* of the stopper protrusions 35 and the perpendicular sides 51*a* of the pin protrusions 51 are in a sheet contact state, the stopper protrusions 35 and the pin protrusions 51 are strongly engaged with one another. Thus, the back plate 30 that has been moved backward cannot be moved forward again.

Thus, even when the occipital area of the person who is seated in the car contacts the headrest 75 that has risen, the headrest 75 supports the occipital portion of the person who is seated in the car, while being fixed to its original position. Thus, neck injury of the person who is seated in the car can be prevented to the maximum.

An engagement force between the stopper protrusions 35 and the pin protrusions 51 should be greater than an elastic force of the back plate spring 60 so that the above-described operations can be smoothly performed.

Also, the present invention may use other type of a safety device than the stopper protrusions 35 and the pin protrusions 51.

In other words, the active headrest apparatus according to the present invention may further include a locking cam 85 that is rotatably combined to the side portions 33 of the back plate 30 via a cam pin 83 and includes a pin confinement portion 85*a* disposed on one end of the locking cam 85, and a circular-arc-shaped cam spring 87 that has one end combined to the side portions 33 of the back plate 30 and the other end combined to the locking cam 85 and provides an elastic restoring force to the locking cam 85.

The pin confinement portion 85*a* has a circular-arc-shape in which its cross-section is hook-shaped and its outer circumferential surface is curved.

Thus, the pin confinement portion 85*a* of the locking cam 85 before the upper body of the person who is seated in the car pressurizes the back plate 30 is maintained to overlap with the slot holes 34 so as to cover a portion of the front end (left end) portions of the slot holes 34, as illustrated in FIG. 5.

In this state, ig the combination pins 50 contact the pin confinement portion 85*a* of the locking cam 85 and pressurize the pin confinement portion 85*a* while the upper body of the person who is seated in the car pressurizes the back plate 30 and the back plate 30 is moved backward, the locking cam 85 is maintained in a contact state with the combination pins 50 and is rotated around the cam pin 83 counterclockwise in the state of FIG. 5 (in this case, the cam spring 87 is in a tensile state). Thus, the back plate 30 can be continuously moved backward (i.e., the combination pins 50 can be continuously moved to the front end portions of the slot holes 34).

The combination pins 50 after the backward movement of the back plate 30 is completed, are disposed in the front end portions (left end portions) of the slot holes 34, as illustrated in FIG. 7. In this case, the locking cam 85 that has been rotated around the cam pin 83 counterclockwise is rotated clockwise due to the restoring force of the cam spring 87 and is restored to its initial state. Thus, the combination pins 50 disposed in the front end portions (left end portions) of the slot holes 34 are confined by the pin confinement portion 85a.

In this manner, when the combination pins 50 disposed in the front end portions (left end portions) of the slots 34 are confined by the pin confinement portion 85a of the locking cam 85, although the occipital area of the person who is seated in the car contacts the headrest 75 that has risen and the back plate 30 is pressurized, the back plate 30 cannot be moved forward again. As such, the headrest 75 that has risen is continuously fixed in its position and supports the occipital area of the person who is seated in the car, thereby preventing neck injury of the person who is seated in the car to the maximum.

The elastic force of the cam spring 87 should be greater than the elastic force of the back plate spring 60 so that the above-described operations can be smoothly performed.

In an embodiment of the present invention, the structure of the safety device including the stopper protrusions 35 and the pin protrusions 51 and the structure of the safety device including the locking cam 85 and the cam spring 87 may be separately or together used. The two structures may be used together in order to maximize the performance of the safety device.

Figure 8:
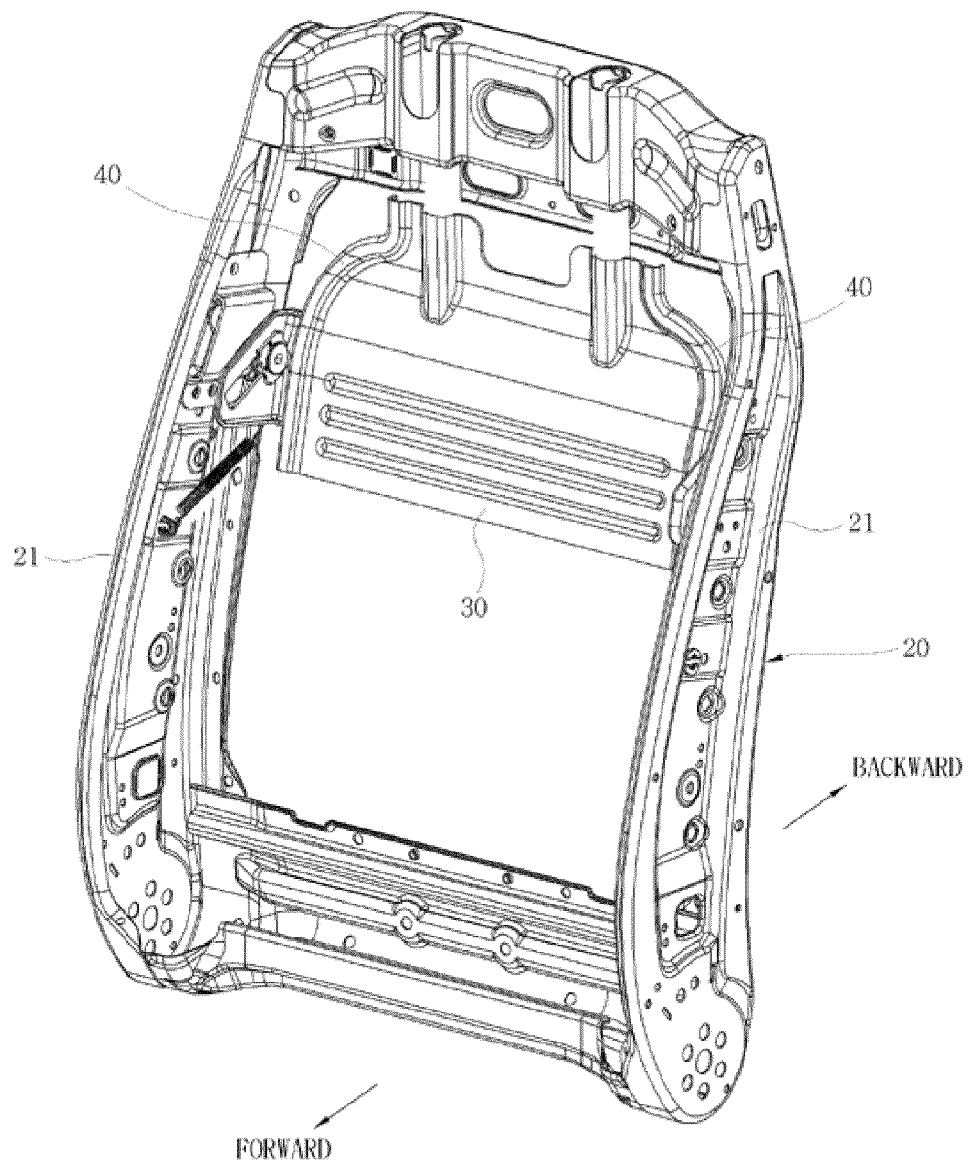
FIG. 8 illustrates an active headrest apparatus in which a back plate and a lower armature are formed as one body, according to another embodiment of the present invention.

Meanwhile, the present invention may use a structure formed as one body by modulating the back plate 30 and the lower armature 40, as illustrated in FIG. 8.

In this case, the lower armature 50 is formed as one body with the back plate 30 along edges of the back plate 30, so that costs can be reduced, operations can be conveniently performed and productivity can be improved.

Figure 1:
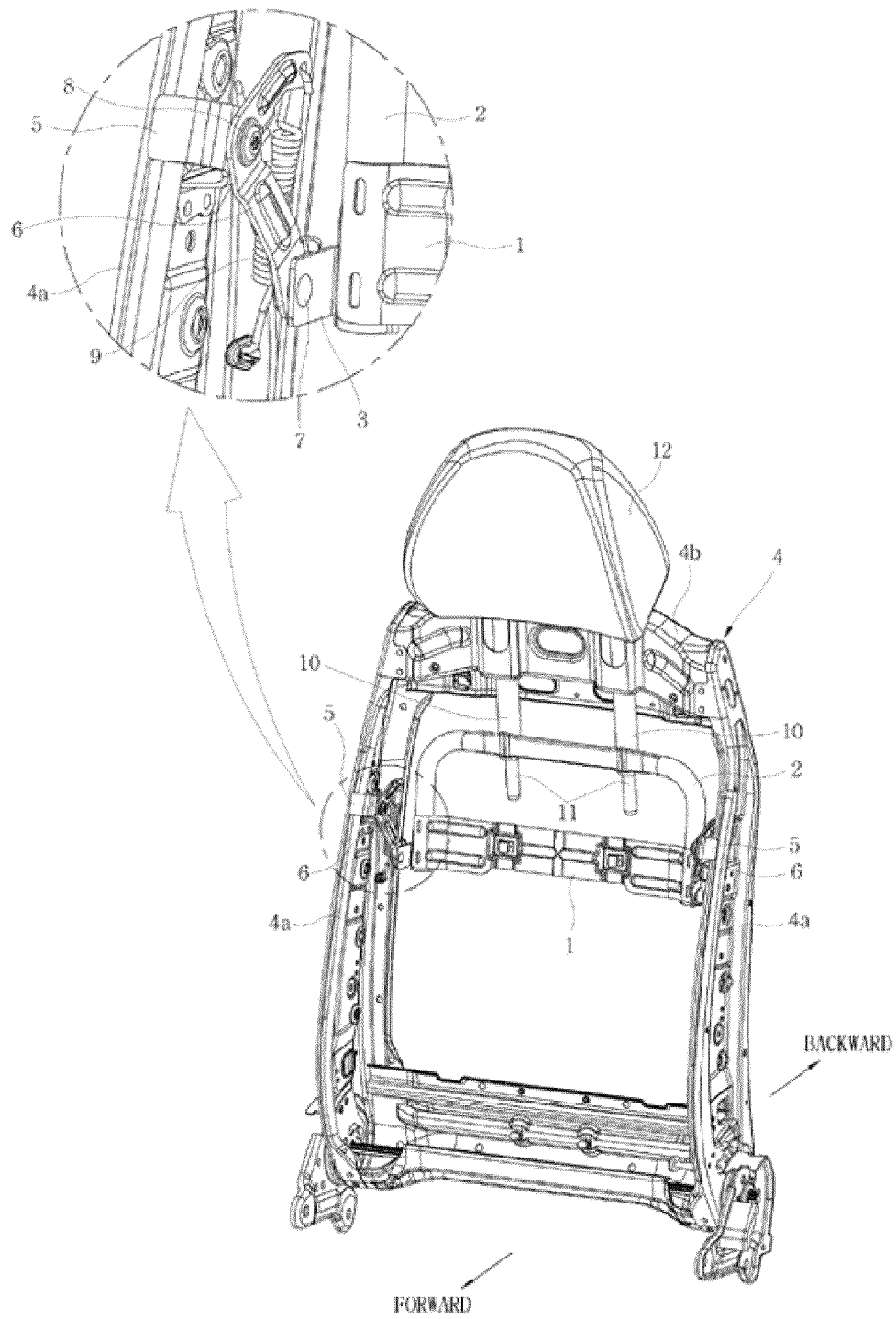
FIG. 1 illustrates a conventional active headrest apparatus.
Figure 2:
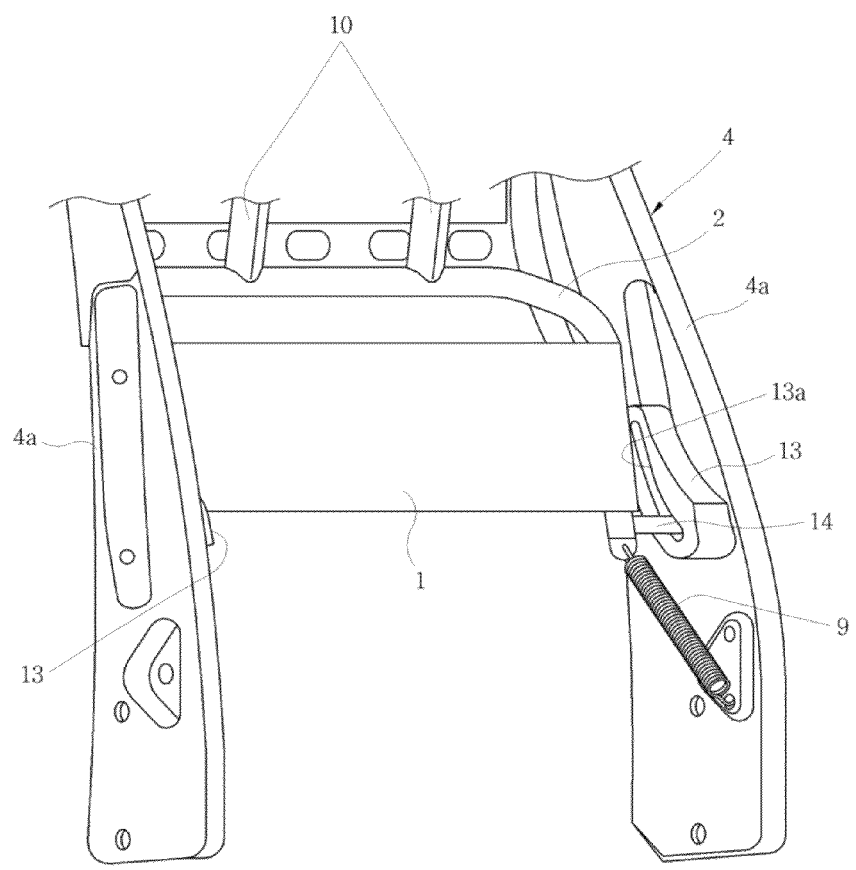
FIG. 2 illustrates another conventional active headrest apparatus.

As described above, a component, such as the frame bracket 5 or the guide member 13 that interferes with the upper body of the person who is seated in the car when the upper body of the person who is seated in the car is moved backward due to the inertia force in the event of the rear-end collision, is not combined to the side frames 21, like in the conventional art described with reference to FIGS. 1 and 2, so that a contact area in which the person who is seated in the car contacts the back plate 30 can be greatly increased.

Then, the pressure applied to the back plate 30 can be increased, and a distance at which the back plate 1 is moved backward can be increased. Thus, a distance at which the headrest 75 rises forward in a direction to the head of the person who is seated in the car can be increased so that the function of the active headrest can be more faithfully performed.

Also, the present invention does not use the component, such as the frame bracket 5 or the guide member 13 used in the conventional art, so that the number of components can be reduced and costs can be reduced.

As described above, in an active headrest apparatus according to the present invention, a contact area in which the upper body of a person who is seated in a car in the event of a rear-end collision of the car is moved backward due to an inertial force and contacts a hack plate can be increased, and a distance at which a headrest is moved and rises can be increased so that the function of an active headrest can be more faithfully performed and neck injury of the person who is seated in the car can be prevented to the maximum.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An active headrest apparatus for a vehicle seat which is connected to both side frames and a upper frame of a seat back frame, comprising:
   a back plate connected to a lower armature and comprising slot holes formed in right and left ends of the back plate;
   combination pins extending through the slot holes and combined with the side frames so that the combination pins are movable along the slot holes;
   a back plate spring having one end connected to the side frames and the other end connected to the back plate and providing an elastic restoring force to the back plate;
   an upper armature combined to the lower armature and having an upper end which extends through the upper frame; and
   a locking cam rotatably combined to the back plate via a cam pin and comprising a pin confinement portion disposed on one end of the locking cam so that the combination pins disposed in an opposite end portion to one end portion of the slot holes are prevented from being restored to the one end portion of the slot holes.

2. The active headrest apparatus of claim 1, wherein the back plate comprises:
   a pressurizing portion being an intermediate portion to which a pressure is applied while the pressurizing portion contacts an upper body of a person who is seated in a car;
   an armature combination portion extending from the pressurizing portion to both sides of the pressurizing portion and combined to the lower armature; and
   right and left both-end side portions extending from the armature combination portion and bent in such a way that the side portions are maintained adjacent to and parallel to the side frames and the slot holes are formed in the side portions, respectively.

3. The active headrest apparatus of claim 2, wherein the slot holes have a backward end that is higher than a forward end thereof.

4. The active headrest apparatus of claim 2, wherein an elastic clip member for elastically supporting the back plate is disposed between the side frames and the side portions of the back plate and is perforated by the combination pins.

5. The active headrest apparatus of claim 1, wherein the slot holes have a backward end that is higher than a forward end thereof.

6. The active headrest apparatus of claim 1, wherein stopper protrusions in which perpendicular sides and inclined sides are continuously connected to one another, are formed in bottom surfaces of the slot holes, and pin protrusions in which perpendicular sides and inclined sides are continuously connected to one another, are formed in the combination pins so that the pin protrusions are engaged with the stopper protrusions.

7. The active headrest apparatus of claim 6, wherein an engagement force between the stopper protrusions and the pin protrusions is greater than an elastic force of the back plate spring.

8. The active headrest apparatus of claim 6, further comprising:

a circular-arc-shaped cam spring having one end combined to the back plate and the other end combined to the locking cam and providing an elastic restoring force to the locking cam.

9. The active headrest apparatus of claim 8, wherein the elastic restoring force of the cam spring is greater than an elastic force of the back plate spring.

10. The active headrest apparatus of claim 1, further comprising:
a circular-arc-shaped cam spring having one end combined to the back plate and the other end combined to the locking cam and providing an elastic restoring force to the locking cam.

11. The active headrest apparatus of claim 1, wherein the back plate and the lower armature are formed as one body, and the lower armature is formed as one body with the back plate along edges of the back plate.

12. An active headrest apparatus for a vehicle seat which is connected to both side frames and a upper frame of a seat back frame, comprising:
a back plate connected to the seat back frame so as to elastically move with respect to the both side frames of the seat back frame forward and backward;
combination pins engaged with the back plate so as to fix a position of the back plate and connecting the side frames and the back plate;
a locking cam rotatably combined to the back plate and confining movement of the combination pins when the back plate is moved backward; and
a cam spring having one end combined to the back plate and the other end combined to the locking cam and providing an elastic restoring force to the locking cam.

* * * * *